UNITED STATES PATENT OFFICE.

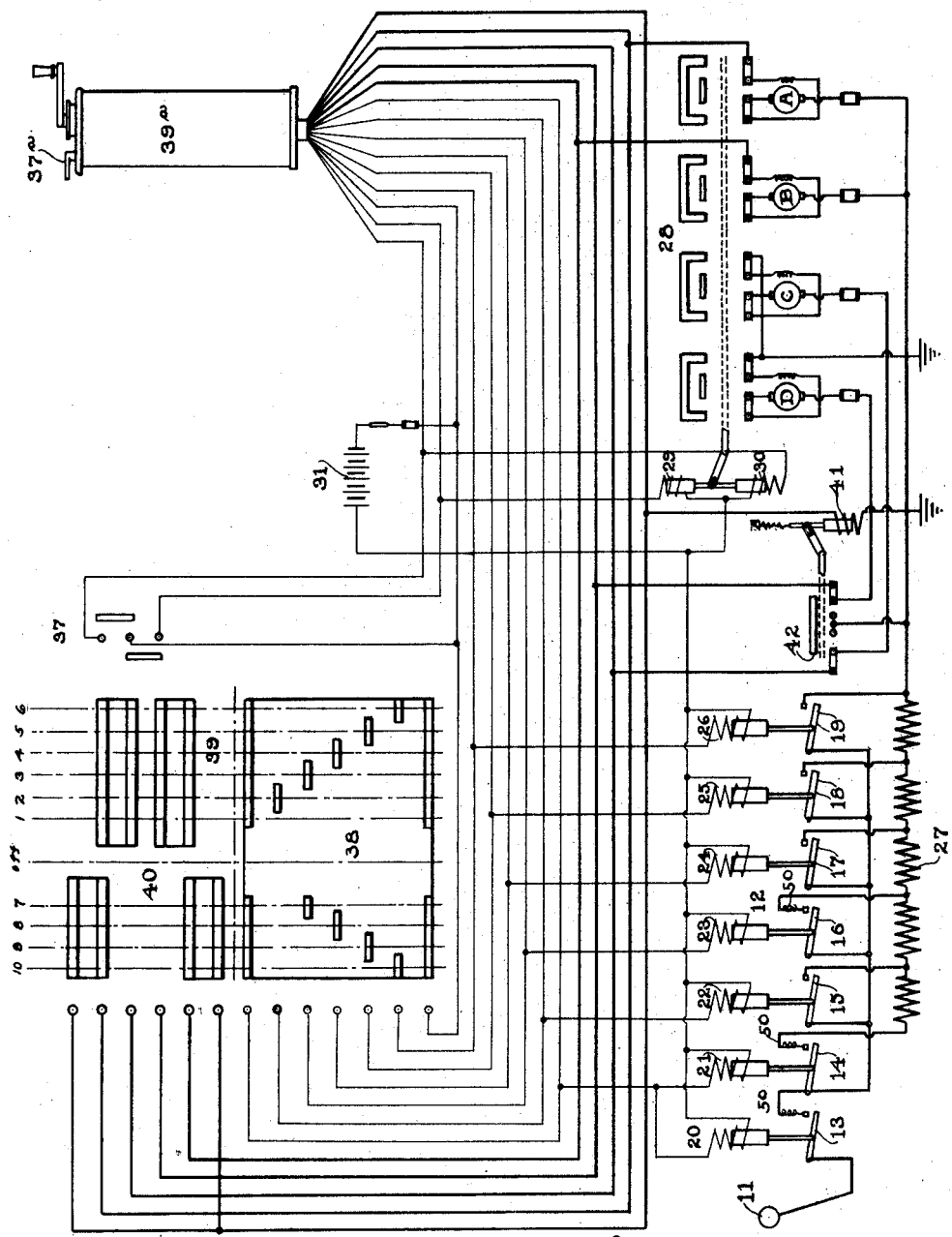

EMMETT W. STULL, OF MILWAUKEE, WISCONSIN, ASSIGNOR TO ALLIS-CHALMERS COMPANY, OF MILWAUKEE, WISCONSIN, A CORPORATION OF NEW JERSEY.

MOTOR-CONTROL SYSTEM.

983,519.  Specification of Letters Patent.  Patented Feb. 7, 1911.

Application filed September 10, 1909. Serial No. 517,025.

*To all whom it may concern:*

Be it known that I, EMMETT W. STULL, a citizen of the United States, residing at Milwaukee, in the county of Milwaukee and State of Wisconsin, have invented certain new and useful Improvements in Motor-Control Systems, of which the following is a full, clear, and exact specification.

My invention relates to motor control systems.

In my co-pending application, Serial No. 424,549, filed April 1, 1908, there is described a motor control system in which a master controller directly connects the motors in various inter-relations and controls the operation of a power-operated controller which varies the resistance in the motor circuits and at which all breaking of circuits occurs. In the control system there shown the full potential of the supply circuit is at certain times applied to the master controller. If the system is a high potential system, it is sometimes desirable to avoid this and at the same time to avoid troubles due to a remotely controlled series-parallel switch under the control of the master controller.

My present invention has for its object to provide a control system in which this is done. In attaining this object I provide a controller which makes the connections of the motors for one inter-relation and part only of the connections of the motors for another inter-relation, a switch which is under the control of the controller making the remaining motor connections for said last mentioned inter-relation. This controller also preferably controls a power-operated controller at which the resistance in the motor circuit is varied and all breaking of circuits occurs.

The various novel features of my invention will appear from the description and drawings, and will be particularly pointed out in the claims.

The single figure of the drawing is a diagram showing the connections of a system arranged in accordance with my invention.

In the arrangement shown there are four motors, A, B, C, and D, and these are supplied with current from a trolley 11 or other suitable current-collecting device. The resistance controller 12 for these motors comprises a plurality of switches 13 to 19 inclusive, operated by solenoids 20 to 26 inclusive respectively. The switch 13 is the main or circuit-closing switch, while the switches 14 to 19 inclusive control the cutting in or out of sections of the resistance 27. To complete the motor circuit, the switch 13 and one of the switches 14 to 19 inclusive must be closed. The main reversing switch 28, which may be of any desired or usual construction and needs no explanation herein, is movable into its two positions by solenoids 29 and 30 respectively. The solenoids 20 to 26 inclusive and 29 and 30 are supplied with current from any desired source, such as a battery 31.

The actuating solenoids 29 and 30 of the main reversing switch are controlled by a master reversing switch 37, connected as shown. The actuating solenoids 20 to 26 inclusive of the resistance controller are controlled by the lower part 38 of the drum controller 39. The upper part 40 of the controller 39 is arranged directly to connect the motors A and B either in series with the motors C and D respectively or to the ground. The connection leading from the controller 39 to the ground includes a solenoid 41, which is thus energized only when the motors A and B are connected directly to the ground through the part 40 of the controller 39. The solenoid 41, when energized, moves the switch 42, which may be of any desired type, to disconnect one terminal of each of the motors C and D from the master controller 39 and to connect such terminals directly to the right hand end of the resistance 27. Any desired interlocking mechanism may be provided between the master reversing switch 37 and the master controller 39.

The master controller 39 illustrated is arranged with its series positions on one side of its off position and its parallel positions on the other side thereof. As shown there are six series positions and four parallel positions, there being fewer parallel positions because it is usually not necessary to connect in the whole resistance in the parallel positions. In moving the controller 39 from the off position to either the series or the parallel side, the upper part 40 thereof is arranged to make its connections before and to break is connections after the lower part 38 does, thus preventing any making or breaking of the main circuit at the controller 39. If desired, means may be provided to prevent the master controller 39 from being moved from off position directly to the parallel positions without first being moved to the series positions. An arrangement for doing this is set forth in my aforesaid co-pending application, but as it forms no part of my present application, it need not be described herein. If desired, however, the controller 39 may have both series and parallel positions on the same side of the off position.

The operation of the system is substantially as follows: The reversing switch 28 is set by a proper movement of the master reversing switch 37 to energize the solenoid 29 or 30. After the reversing switch 28 has been set as desired, the controller 39 is moved into position 1, in such movement first connecting the motors A and B in series respectively with the motors C and D and then completing the circuit from the battery 31 to the solenoids 20 and 21. The latter immediately close their associated switches 13 and 14, thus completing the motor circuit through the whole resistance 27. As the controller is moved forward to positions 2, 3, 4, 5, and 6, the solenoids 22, 23, 24, 25, and 26 are successively energized to close their associated switches, thus gradually cutting the resistance 27 out of circuit. The part 38 of the controller 39 may be arranged either to interrupt or to maintain closed the circuit of each of the solenoids 22 to 25 inclusive as it is moved forward to complete the circuit of the solenoid next to the right thereof. With the controller 39 in position 6, the final series position, the motors A and B are connected in series with the motors C and D respectively with none of the resistance 27 in circuit. By a comparatively rapid movement the controller 39 is now moved from position 6 through the off position to the first parallel position, position 7. Electrically, this movement causes the following actions in sequence: The resistance 27 is again cut into circuit either gradually or suddenly according as the switches 15 to 18 inclusive are closed or open when the controller 39 in its movement toward off position passes beyond the position in which such switches are respectively caused to be raised; the motor circuit is broken by the practically simultaneous opening of the switches 13 and 14, which divide any arc which may be formed; the series connection of the main motors is unmade by the upper part 40 of the controller 39; one terminal of each of the motors A and B is connected to ground through the solenoid 41 by the upper part 40 of the controller 39; the solenoids 20, 21, and 23 are energized, the last either at the same time as or slightly later than the other two, to cause the switches 13, 14, and 16 to be closed to complete the circuit of the motors A and B and cut out part of the resistance 27; the solenoid 41 is energized by the closing of the aforesaid switches and moves the switch 42 to disconnect the trolley side of each of the motors C and D from the controller 39 and connect it directly to the right hand end of the resistance 27, thus completing the circuit of such motors. The motors A, B, C, and D are now all connected in parallel. As the controller 39 is moved to positions 8, 9, and 10, the solenoids 24, 25, and 26 are energized to cause the successive operation of the switches 17, 18, and 19 to cut out the remainder of the resistance 27.

When the motors are connected in parallel, the only connection of the master controller drum to the main circuit is on the ground side of such main circuit. When the motors are connected in series, the potential of the controller is never higher than half that of the trolley. Thus the full potential of the trolley is never applied to any part of the master controller.

To stop the motors it is only necessary to move the controller 39 from any position in which it may be to the off position, it being unnecessary when such position is one of the parallel positions for the controller to pass through any of the series positions. In such backward movement from position 10, for instance, the resistance 27 or part of it is cut into circuit, the circuit is broken at the switches 13 and 14 or 13 and 16 according as the switch 16 is open or closed as the controller 39 passes backward beyond position 6, the solenoid 41 is in consequence deenergized and the switch 42 allowed to return to normal position to dis-connect from the resistance 27 the trolley terminals of the motors C and D and connect such terminals to their contact fingers on the controller 39, and the ground connection of the motors A and B is unmade by the upper part 40 of the controller 39. Thus the breaking of the circuit always takes place at the switch 13 and the switch 14 or 16, which are preferably provided with blow-out coils 50. The breaking of the main circuit never occurs at the controller 39 or at the switch 42.

In the arrangement shown, there is in addition to the controller 39 shown in development, another similar controller 39$^a$, including a master reversing switch 37$^a$. Either the controller 39$^a$, which is shown merely in diagrammatic elevation, or the controller 39, may be used to control the system. Although only two such controllers are shown, any desired number may be provided, and any one of them used for controlling the motors.

Although four motors are here shown arranged to be connected in parallel series and in full parallel, any other desired number of motors may be used and the motors may be connected in other inter-relations than those mentioned. For instance, by omitting the lower half of the part 40 of the controller and the right hand half of the switch 42, the system is suitable without other change for the series-parallel control of the motors A and C. Instead of the single motors A, B, C, and D, there may be groups of any desired number of motors.

Many other changes in the precise arrangement here shown and described may be made without departing from the spirit and scope of my invention, and all such I aim to cover in the following claims.

What I claim as new is:

1. A motor control system, comprising a plurality of motors, a power-operated switch at which all breaking of the motor circuits occurs, and a controller for controlling the operation of said switch and for directly connecting all the motors for a certain inter-relation and part of the motors for another inter-relation.

2. A motor control system, comprising a plurality of motors, a power-operated switch at which all breaking of the motor circuits occurs, a controller for controlling the operation of said switch, and for directly connecting all the motors for a certain inter-relation and part of the motors for another inter-relation, and a switch controlled by the master controller for connecting the remainder of the motors for said last named inter-relation.

3. A motor control system, comprising a plurality of motors, a controller for varying the speed of the motors, a switch, and a second controller controlling said first mentioned controller and said switch and arranged for directly connecting the motors for a certain inter-relation and in coöperation with said switch for connecting the motors for another inter-relation.

4. A motor control system, comprising a plurality of motors, a power-operated controller for varying the resistance in circuit therewith, and a manually operated master controller which also directly makes the connections for putting the motors in series and part of the connections for putting the motors in parallel.

5. A motor control system, comprising a plurality of motors, a power-operated controller for varying the resistance in circuit therewith, a manually operated master controller which also directly makes the connections for putting the motors in series and makes part of the connections for putting the motors in parallel, and a switch controlled by said master controller for making another part of the connections for putting the motors in parallel.

6. A motor control system, comprising a plurality of motors, a variable resistance, a controller for connecting the motors in series between the resistance and one side of the line and for connecting a part only of the motors directly between the resistance and said side of the line, and a switch for connecting the remainder of the motors directly between the resistance and said side of the line.

7. A motor control system, comprising a plurality of motors, a variable resistance, a controller for connecting the motors in series between the resistance and one side of the line and for connecting a part only of the motors directly between the resistance and said side of the line, and a switch operated when the circuit is completed for said last named connection for connecting the remainder of the motors directly between the resistance and said side of the line.

8. In combination, a plurality of motors, a remotely controlled resistance therefor, a manually operated controller which makes part of the connections for putting the motors in series and in parallel, and a switch which makes another part of said connections.

9. In combination, a plurality of motors, a controller which directly makes the connections to put said motors in one inter-relation and part of the connections to put them in another inter-relation, and a switch controlled by said controller for making another part of the connections to put the motors in said last named inter-relation.

10. In combination, a plurality of motors, a controller for directly connecting said motors in series relation and for making part of the connections for putting said motors in parallel relation, and a switch controlled by said master controller for making the remainder of the connections for putting said motors in parallel relation.

11. In combination, two motors, a variable resistance, a controller for controlling said resistance and arranged directly to connect said two motors in series and one of said motors between one end of the resistance and one side of the circuit, and a switch which is closed by the completion of the circuit for said last named connection for connecting the other motor in the same way.

Milwaukee, Wis., August 27, 1909.

In testimony whereof I affix my signature, in the presence of two witnesses.

EMMETT W. STULL.

Witnesses:
 H. C. CASE,
 G. B. SCHLEY.